United States Patent [19]

Holsztynski et al.

[11] Patent Number: 5,421,019

[45] Date of Patent: May 30, 1995

[54] PARALLEL DATA PROCESSOR

[75] Inventors: Wlodzimierz Holsztynski, Mountainview, Calif.; Richard W. Benton, Altamonte Springs, Fla.; W. Keith Johnson, Goleta, Calif.; Robert A. McNamara, Orlando, Fla.; Roger S. Naeyaert, Plano, Tex.; Douglas A. Noden; Ronald W. Schoomaker, both of Orlando, Fla.

[73] Assignee: Martin Marietta Corporation, Bethesda, Md.

[21] Appl. No.: 948,617

[22] Filed: Sep. 23, 1992

Related U.S. Application Data

[63] Continuation of Ser. No. 254,718, Oct. 7, 1988, abandoned.

[51] Int. Cl.$^6$ .............................................. G06F 15/16
[52] U.S. Cl. ...................... 395/800; 364/231.9; 364/239.5; 364/246.3; 364/229.4; 364/DIG. 1
[58] Field of Search ........................... 395/425, 800; 365/230.05, 189.07

[56] References Cited

U.S. PATENT DOCUMENTS

| | | | |
|---|---|---|---|
| 3,287,703 | 11/1966 | Slotnick | 395/800 |
| 3,643,236 | 2/1972 | Kolankowski | 340/173 R |
| 3,815,095 | 6/1974 | Wester | 364/200 |
| 4,167,780 | 9/1979 | Hayashi | 364/200 |
| 4,187,551 | 2/1980 | Nutter | 364/900 |
| 4,215,401 | 7/1980 | Holsztynski et al. | |
| 4,309,755 | 1/1982 | Lanty | 364/200 |
| 4,314,349 | 2/1982 | Batcher | 364/716 |
| 4,384,273 | 5/1983 | Ackland | 364/900 |
| 4,489,381 | 12/1984 | Lavallee | 364/200 |
| 4,507,726 | 3/1985 | Grinberg | 364/200 |
| 4,511,967 | 4/1985 | Witalka | 364/200 |
| 4,517,659 | 5/1985 | Chamberlain | 364/900 |
| 4,524,455 | 6/1985 | Holsztynski et al. | 382/41 |
| 4,533,993 | 8/1985 | McCanny et al. | 364/200 |
| 4,573,116 | 2/1986 | Ong | 364/200 |
| 4,574,394 | 3/1986 | Holsztynski | 364/200 |
| 4,623,990 | 11/1986 | Allen | 365/189.04 |
| 4,628,481 | 12/1986 | Reddaway | 364/900 |
| 4,630,230 | 12/1986 | Sundet | 395/425 |
| 4,635,292 | 1/1987 | Mori | 364/900 |
| 4,660,155 | 4/1987 | Thaden | 340/798 |
| 4,663,742 | 5/1987 | Anderson | 365/189.04 |
| 4,667,308 | 5/1987 | Hayes | 364/97 |
| 4,720,780 | 1/1988 | Dolecek | 364/200 |
| 4,739,474 | 4/1988 | Holsztynski | 364/200 |
| 4,739,476 | 4/1988 | Fiduccia | 364/200 |
| 4,769,779 | 9/1988 | Chang | 364/726 |
| 4,884,190 | 11/1989 | Ngai | 364/200 |
| 4,933,846 | 6/1990 | Humphrey | 364/200 |

FOREIGN PATENT DOCUMENTS

| | | |
|---|---|---|
| 0223690 | 5/1987 | European Pat. Off. |
| 0237218 | 9/1987 | European Pat. Off. |
| WO86/0338 | 5/1984 | WIPO |

OTHER PUBLICATIONS

Interconnect Strategies for Fault Tolerant 2D VLSI Arrays by Pan/Franzen, 1986 IEEE, pp. 230-233.
"Interconnect Strategies for Fault Tolerant 2D VSLI Arrays", Paul Franzon, IEEE International Conference on Computer Design: VLSI in Computers (Oct. 1986).
Pub. by C. C. Weems entitled "Some Example Algorithms for the CAAPP and ICAP Levels of the Image Understanding Architecture", ICS 88. Third Intl. Conf. on Supercomputing. Proceedings, Supercomputing '88, pp. 42-53, pub. May 15-20, 1988, Boston, Mass.

(List continued on next page.)

Primary Examiner—Eric Coleman
Attorney, Agent, or Firm—Burns, Doane, Swecker & Mathis

[57] ABSTRACT

A parallel data processor comprised of an array of identical cells concurrently performing identical operations under the direction of a central controller, and incorporating one or more of a special cell architecture including a segmented memory, conditional logic for preliminary processing, and circuitry for indicating when the cell is active, and programmable cell interconnection including cell bypass and alternate connection of edge cells.

43 Claims, 9 Drawing Sheets

OTHER PUBLICATIONS

Pub. by D. I. Moldovan et al. entitled "Parallel Processing of Iconic to Symbolic Transformation of Images", Proceedings CVPR '85: IEEE Computer Society Conf. on Computer Vision & Pattern REcognition (Cat. #85CH2145-1), pp. 257-264, pub. Jun. 19-23, 1985, San Francisco, Calif.

Pub. by M. E. Steenstrup et al. entitled "Determination of the Rotational and Translational Components of a Flow Field Using a Content Addressable Parallel Processor", Proceedings of the 1983 Intl. Conf. on Parallel Processing, pp. 492-495, publ Aug. 1983, Bellaire, Mich.

Pub. by J. G. Bonar et al. entitled "Real-Time LISP Using Content Addressable Memory", Proc. of the 1981 Conf. on Parallel Processing, pp. 112-119, pub. Aug. 25-28, 1981.

Pub. by D. Rana et al. entitled "An Easily Reconfigurable Circuit Switched Connection Network", Proceedings of the 1988 IEEE International Symposium on Circuits and Systems, vol. 1, pp. 247-250, pub. Jun. 7-9, 1988.

Pub. by C. C. Weems Jr. entitled "The Content Addressable Array Parallel Processor: Architectural Evaluation and Enhancement", Proceedings of the IEEE International Conference on Computer Design: VLSI in Computers, pp. 500-503, publ Oct. 7-10, 1985.

Pub. by C. Weems et al. entitled "Iconic and Symbolic Processing Using a Content Addressable Array Parallel Processor", Proceedings of the IEEE Computer Society Conference on Computer Vision and Pattern Recognition, pp. 598-607, pub. Jun. 19-23, 1985.

Pub. by D. Lawton et al. entitled "Iconic to Symbolic Processing Using a Content Addressable Array Parallel Processor", Proceedings of SPIE-The International Society for Optical Engineering: Applications of Digital Image Processing VII, vol. 504, pp. 92-111, pub. Aug. 21-24, 1984.

Pub. by C. Weems and D. T. Lawton entitled "Incorporating content addressable array processors into computer vision systems", Proceedings of SPIE-The International Society for Optical Engineering: Architecture and Algorithms for Digital Image Processing, vol. 435, pp. 121-123, pub. Aug. 25-26, 1983.

Pub. by M. E. Steenstrup et al. entitled "Determination of the Rotational and Translational Components of a Flow Field Using a Content Addressable Parallel Processor", Proceedings of the IEEE Computer Society Conference on Computer Vision and Pattern Recognition, pp. 401-404, pub. Jun. 19-23, 1983.

Pub. by C. Weems et al. entitled "A VLSI Based Content Addressable Parallel Array Processor", Proceedings of the IEEE International Conference on Circuits and Computers, pp. 236-239, pub. Sep. 28-Oct. 1, 1982.

Pub. by A. R. Hanson and E. M. Riseman entitled "Summary of Progress in Image Understanding at the University of Massachusetts", Proceedings of the Image Understanding Workshop, vol. 1, pp. 55-64, pub. Feb. 23-25, 1987.

Pub. by R. R. Kohler and A. R. Hanson entitled "The VISIONS Image Operating System", Proceedings of the 6th International Conference on Pattern Recognition, vol. 1, pp. 71-74, published Oct. 19-22, 1982.

Pub. by P. A. Nagin et al. entitled "Region Relaxation in a Parallel Hierarchical Architecture", Real-Time/-Parallel Computing Image Analysis, pp. 37-61 (M. Onoe, K. Preston, Jr., and Azriel Rosenfeld eds.), published 1981.

Pub. by D. M. Chiarulli et al. entitled "Using Coincident Optical Pulses for Parallel Memory Addressing", Computer, vol. 20(12), pp. 48-57, published Dec. 1987.

Pub. by S. P. Levitan entitled "Algorithms for a Broadcast Protocal Multiprocessor", the 3rd International Conference on Distributed Computing Systems pp. 666-671, pub. Oct. 18-22, 1982.

Pub. by C. C. Weems, Jr. entitled "Image Processing on a Content Addressable Array Parallel Processor", COINS Technical Report 84-14, pp. vi-xv; 8-58, 85-194, 341-407, 431-492, published Sep. 1984.

Pub. by C. C. Weems et al. entitled "The image understanding architecture project, first annual report", pp. iii-85, and 137-172, published Apr. 1988.

John Smit, "Architecture Descriptions for the Massively Parallel Processor (MPP) and the Airborne Associative Processor (ASPRO)", Aug. 8, 1980 (Goodyear Aerospace Corporation) GER-16785.

T. J. Fountain, "An Evaluation of Some Chips for Image Processing", Univ. College London.

"Geometric Arithmetic Parallel Processor", (NCR) Model No. NCR450G72.

"Calculateur Cellulaire Universel Destine a L'Etude Des Structures Cellulaires Specialisees", J. Rochez, Digital Processes, vol. 3, No. 2, pp. 121-138 (1977).

PARALLEL DATA PROCESSOR

This application is a continuation of application Ser. No. 07/254,718, filed Oct. 7, 1988, now abandoned.

BACKGROUND OF THE INVENTION

1. Field of the Invention

The present invention relates to a high speed parallel data processing system and, more particularly, to a parallel data processing system comprised of an array of identical interconnected cells operating under the control of a master controller to operate on single bits of data. Even more particularly, the invention pertains to the architecture of the cells and to specific patterns of interconnection.

2. Background Art

Certain data processing tasks require that substantially identical logical or arithmetic operations be performed on large amounts of data. One approach to carrying out such tasks which is drawing increasing attention is parallel processing. In parallel processing, each element or cell of an array processor made up of such cells processes its own bit of data at the same time as all other cells of the array processor perform the same process on their own bit of data. Such machines are referred to by several names, including Single Instruction-Multiple Data (SIMD) machines.

A common arrangement for such a machine is as a rectangular array of cells, with each interior cell connected to its four nearest neighboring cells and each edge cell connected to a data input/output device. Each cell is connected as well to a master controller which coordinates the movement of data through the array by providing appropriate instructions to the processing elements. Such an array proves useful, for example, in high resolution image processing. The image pixels comprise a data matrix which can be loaded into and processed quickly and efficiently by the processor array.

Although all may be based upon the same generic concept of an array of cells all performing the same function in unison, parallel processors vary in details of cell design. For example, U.S. Pat. No. 4,215,401 to Holsztynski et al discloses a cell which includes a random access memory (RAM), a single bit accumulator, and a simple logical gate. The disclosed cell is extremely simple and, hence, inexpensive and easily fabricated. A negative consequence of this simplicity, however, is that some computational algorithms are quite cumbersome so that it may require many instructions to perform a simple and often repeated task.

U.S. Pat. No. 4,739,474, to Holsztynski et al, represents a higher level of complexity, in which the logic gate is replaced by a full adder capable of performing both arithmetic and logical functions. Pressing the full adder into dual service creates an efficiency which more than offsets the added complexity and cost incurred by including a full adder in each cell.

It is important to note that the substitution of a full adder for a logic gate, while superficially simple, is in reality a change of major consequence. The cell structure cannot be allowed to become too complex. This is because in a typical array the cell will be repeated dozens if not hundreds of times. The cost of each additional element in terms of money and space on a VLSI chip is therefore multiplied many times. It is therefore no simple matter to identify those functions which are sufficiently useful, to justify their incorporation into the cell. It is similarly no simple matter to implement those functions so that their incorporation is not realized at too high a cost.

Parallel processors may also vary in the manner of cell interconnection. As mentioned above, cells are typically connected to their nearest physical neighbors. All cells except those at the edge of the entire array are connected to four neighbors. It has not heretofore been completely appreciated, however, that significant benefits may flow from providing for alternate paths of interconnection and, specifically, in providing programmable, flexible interconnection between cells.

SUMMARY OF THE INVENTION

There is thus a continuing need to identify and implement variations in cell architecture which result in a maximal increase in cell efficiency with a minimal increase in cell complexity. This need is addressed in the present invention through the provision in each cell of a segmented random access memory to permit the performance of more than one read/write operation per clock cycle. It is further addressed through the provision of circuitry ahead of the main processing element for conditionally processing data prior to processing in the main processing element. It is further addressed through the provision of circuitry in the cell by which the master controller can deactivate or activate the cell, or by which the cell can provide indication of whether the cell has activated or deactivated itself. This permits independent conditional operations for each individual cell.

The present invention not only exploits variations in cell architecture, but also in cell interconnection. In one enhancement, at least one bypass network is intermeshed with the array for bypassing cells as needed or desired. In another embodiment, in which the cells are arranged in an n×m array, cells on at least one edge are arranged to become connectable to either an external device or to another cell in the array, thus creating the ability to reshape the virtual configuration of the array.

BRIEF DESCRIPTION OF THE DRAWINGS

The foregoing and other features of the present invention will become apparent to one of ordinary skill in the art to which the invention pertains from the following detailed description when read in conjunction with the drawings, in which.

DETAILED DESCRIPTION OF THE PREFERRED EMBODIMENT

Figure 1:
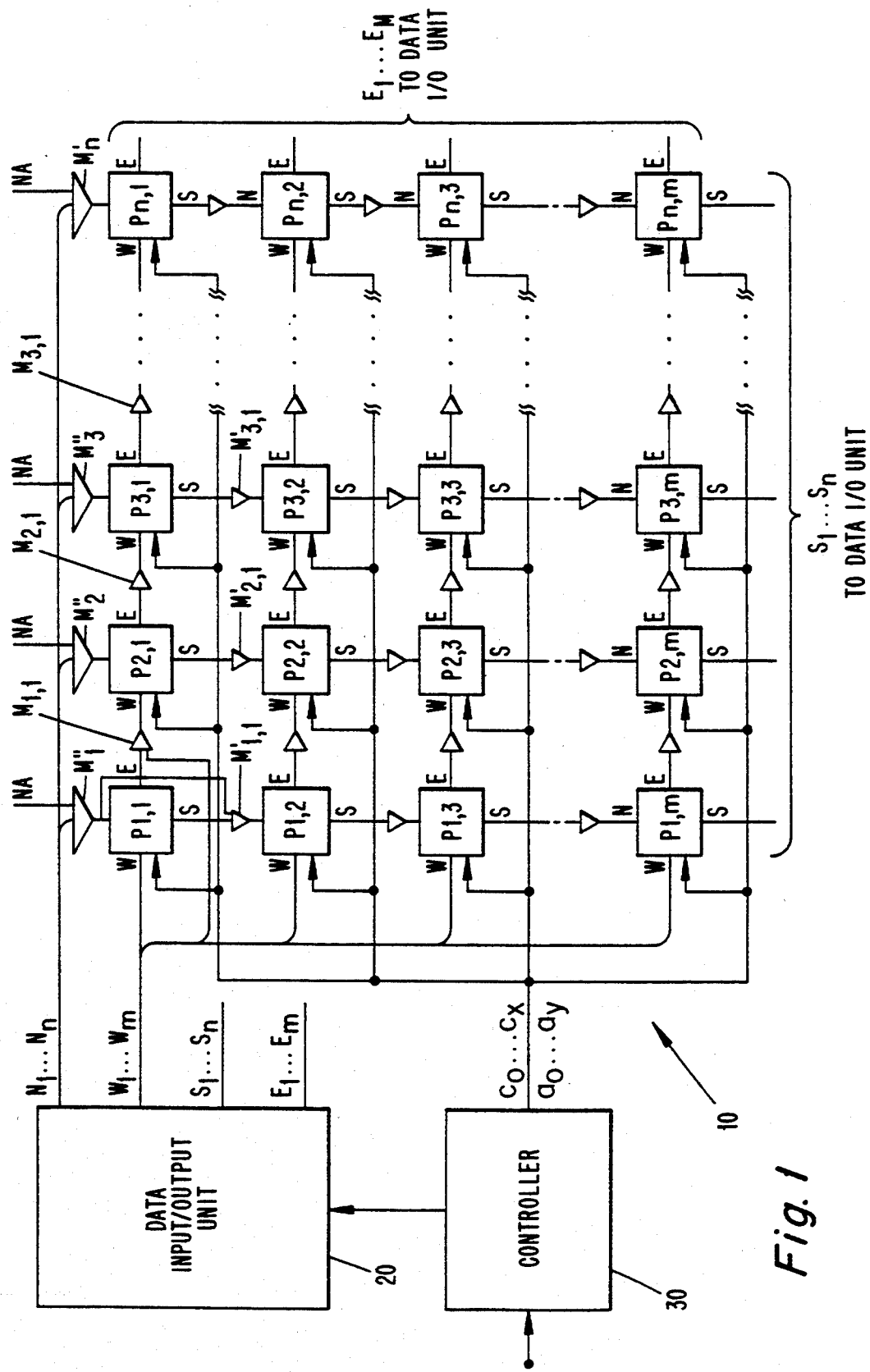
FIG. 1 is a block diagram of a preferred embodiment of a processor array according to the invention.

General details concerning the arrangement of parallel processors as art array of identical cells are available from aforementioned U.S. Pat. No. 4,739,474 to Holsztynski et al, the specification of which is hereby incorporated by reference. As shown in that patent and in FIG. 1 herein, an array 10 may comprise n rows and m columns of identical processors or cells $P_{1,1}$ through $P_{n,m}$ to form an n×m rectangular network or matrix (the subscripts "n" and "m" representing variables which may assume any positive integral value). There are thus cells having four nearest neighbors (interior cells) and cells having less than four nearest neighbors (edge cells). For uniform orientation, the directions north, south, east, and west are used to reference up, down, right, and left, respectively, in the drawing, so that the nearest neighbors will be referred to as N, S, E, and W, respectively.

The edge cells of the array 10 are connected to a data input/output unit 20 as illustrated. Every cell receives command and address signals Co - Cx and Ao - Ay, respectively, from a controller 30. In addition, clock signals may be provided by the controller 30 to each cell, and the data input/output unit 20 may also be controlled by the controller 30. These and other details are available from the Holsztynski et al '474 patent.

FIG. 1 also shows two multiplexer networks intermeshed with the cell array. The first multiplexer network is made up of multiplexers $M_{1,1}$ through $M_{n,m}$ and $M_{1,1}'$ through $M_{n,m}'$ ("n" and "m" here and elsewhere assuming values not necessarily related to those assumed in connection with labelling the cells unless otherwise specified). As will be developed below, this network is used for selective bypass of cells on an individual, row, column, or block basis.

The second multiplexer network is made up of multiplexers $M_1''$ through $M_n''$, and is used for selectively altering the connection of the north edge cells to either the data input/output unit 20 or to another cell in the array. An array may be made up of several interlinked chips, each supplying its own section or subarray of the main array. The second multiplexer network provides a capability of changing the virtual configuration of the array.

All of the multiplexers are responsive to the controller 30 through connections which have been omitted for clarity. It should be noted that the communication paths provided by the multiplexers are bidirectional, so that the multiplexers should be regarded as multiplexer/demultiplexers. It should also be noted that the term multiplexer is used herein generically to encompass any device for performing the functions ascribed to these elements, i.e., line selection based on a control input. Thus, simple switches may be multiplexers to the extent they are provided to perform such a function.

Figure 2:
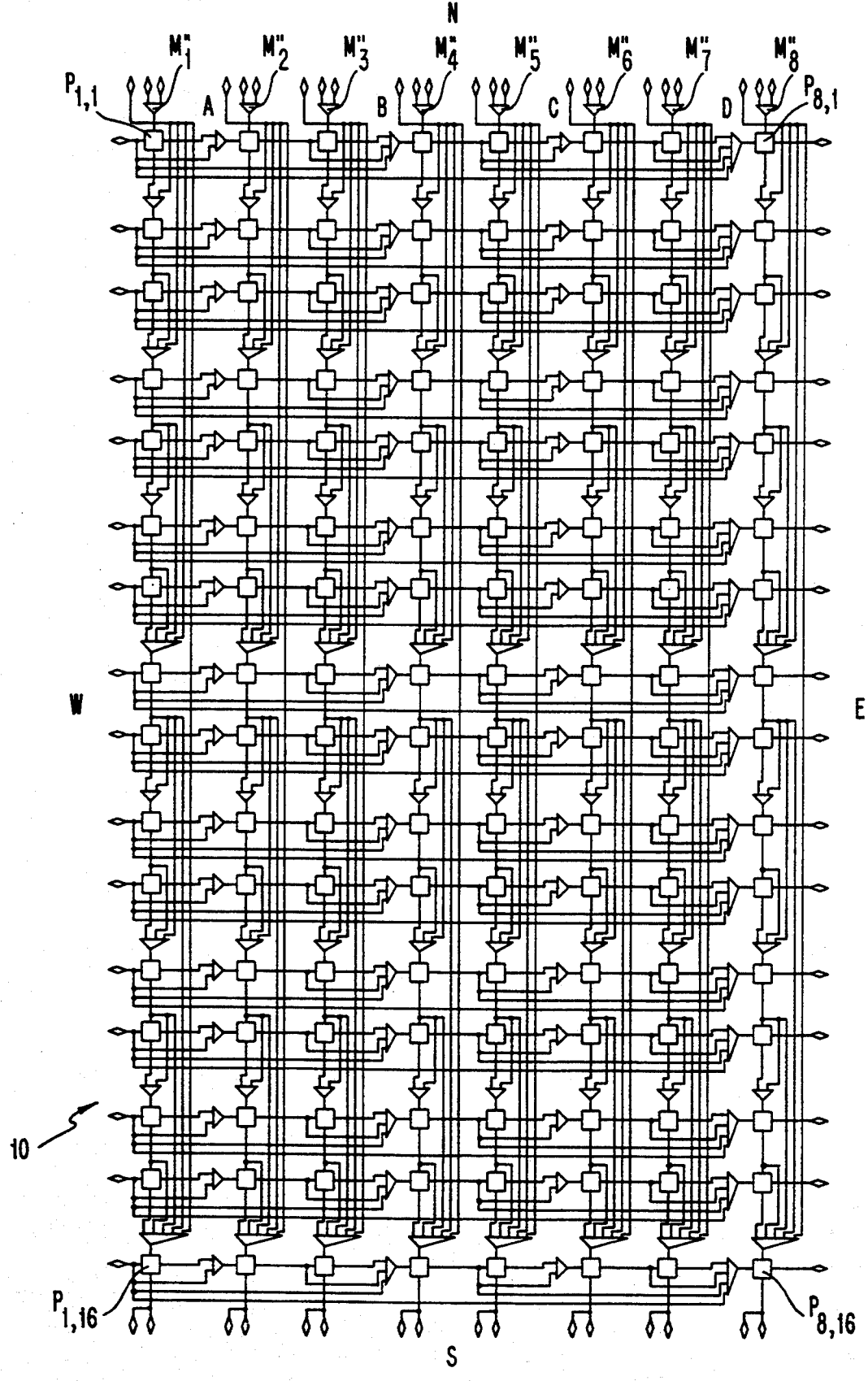
FIG. 2 is a schematic diagram of a second preferred embodiment of a processor array according to the invention.

FIG. 2 is a more detailed rendering of an array 10 according to the present invention, in this case an 8×16 array of 128 identical cells $P_{1,1}$–$P_{8,16}$. Peripheral equipment such as controller 30 and connections thereto have been omitted for clarity, but it will be understood that such connections are present. The embodiment of FIG. 2 has a multiplexer bypass network with members arranged between selected cells thus bypassing intervening cells. As can be seen, it is not necessary that there be a multiplexer between every cell and its nearest neighbors in order to bypass entire rows, columns, or blocks and so, in effect, alter the virtual dimensions of the array to suit a particular application. In the embodiment shown, there is one set of eight multiplexers per column and one set of four per row. Thus, in general, it is necessary only to have half as many multiplexers as cells in any row or column. Of course, if there is an alternate communication path, (such as the CM path described below) it may be desirable to provide that path with a multiplexer network as well.

When cell bypass is invoked, cell-to-cell communication is based on the value of a latched bypass control word which continuously drives the row and column multiplexer select lines. If it were desired to bypass the first column, for example, the westernmost I/O pins become logically connected to the west port of the cells in the second column.

Row and column bypass can be separately controlled so that all possible virtual array sizes, such as 7×12, 4×10, 1×16, or even 1×1, can be obtained. The embodiment of FIG. 2, however, is designed so that it is not possible to bypass the array 10 entirely. The cells in the easternmost column are always connected to the east I/O pins so that data must always pass through the easternmost column of cells. Similarly, the cells in the southernmost row are always connected to the south I/O pins so that data must always pass through the southernmost row of cells. There is therefore a minimum 1×1 configuration.

The benefits of the cell bypass network are well exemplified in operations such as parallel data summation, also known as an array sum. An array sum is a summation of the same data type variable in each cell throughout the entire array. With programmable bypass, this summation may be achieved using the following algorithm:

(1) program the cell bypass network to full 8×16 configuration;

(2) command each cell to shift its variable to its eastern neighbor;

(3) command each cell to add the received variable to its resident value (which results in cells in columns 2, 4, 6, and 8 containing a non-overlapping set of sums);

(4) program the cell bypass network to a 4×16 configuration logically interconnecting columns 2, 4, 6, and 8;

(5) repeat steps (2) and (3) (which results in cells in columns 4 and 8 containing a non-overlapping set of sums);

(6) program the cell bypass network to a 2×16 configuration logically interconnecting cells in column 4 to cells in column 8;

(7) repeat step 5 (which results in cells in column 8 containing the sums for the entire array from west to east); and (8) repeat the algorithm north to south to sum cells in column 8, halving the row configuration after each shift and add until the entire array sum resides in the cell at the southeastern corner of the array.

Without the cell bypass network, many additional clock cycles would be required to shift the data through the non-participating cells to the ultimate destination when performing the partial array summations. The cell bypass network allows direct cell communication for a minimal overhead of 2 cycles for array reconfiguration.

Figure 3A:
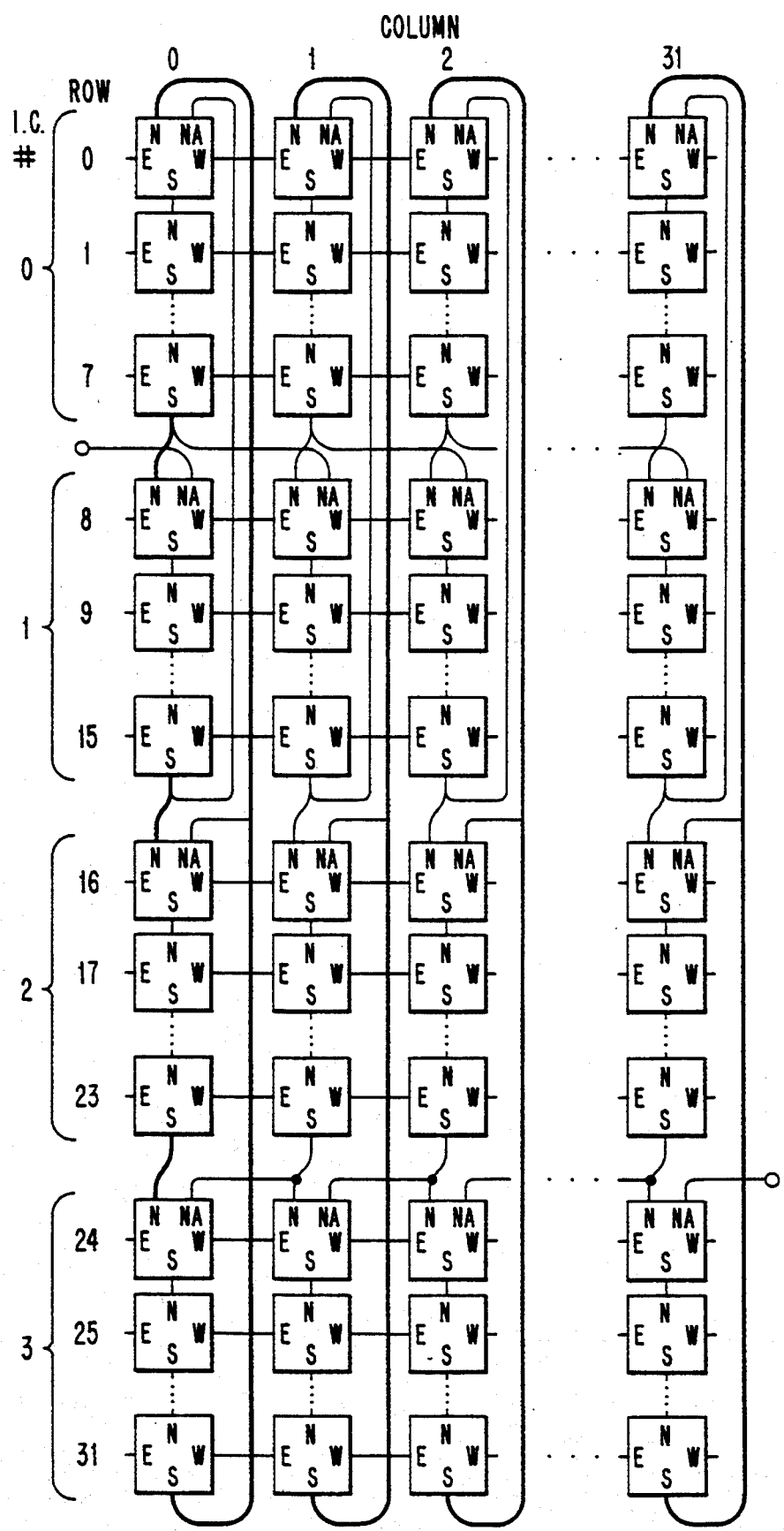
FIGS. 3(a), 3(b), and 3(c) are block diagrams showing alternate array interconnection according to a preferred embodiment of the invention.
Figure 3B:
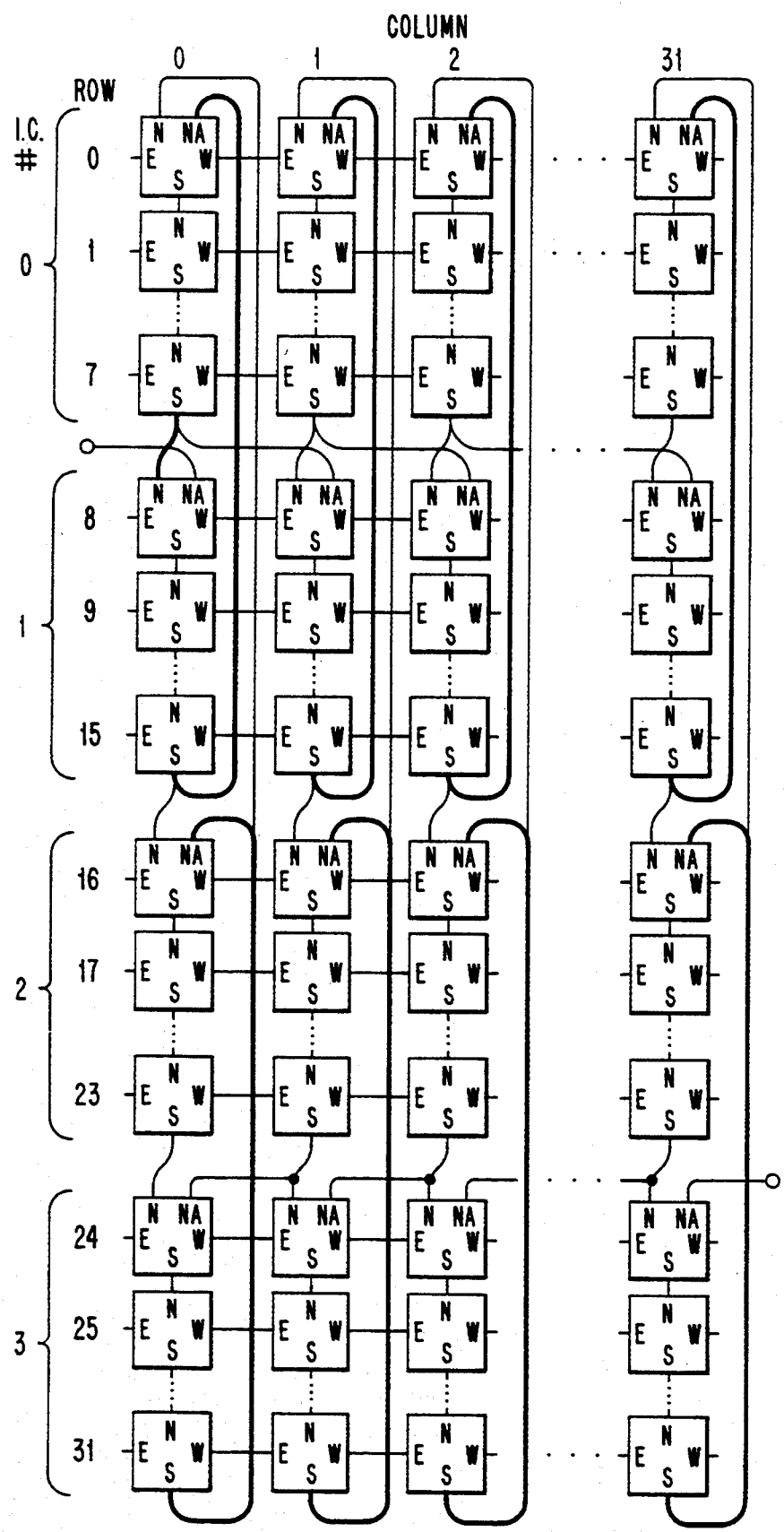
Figure 3C:
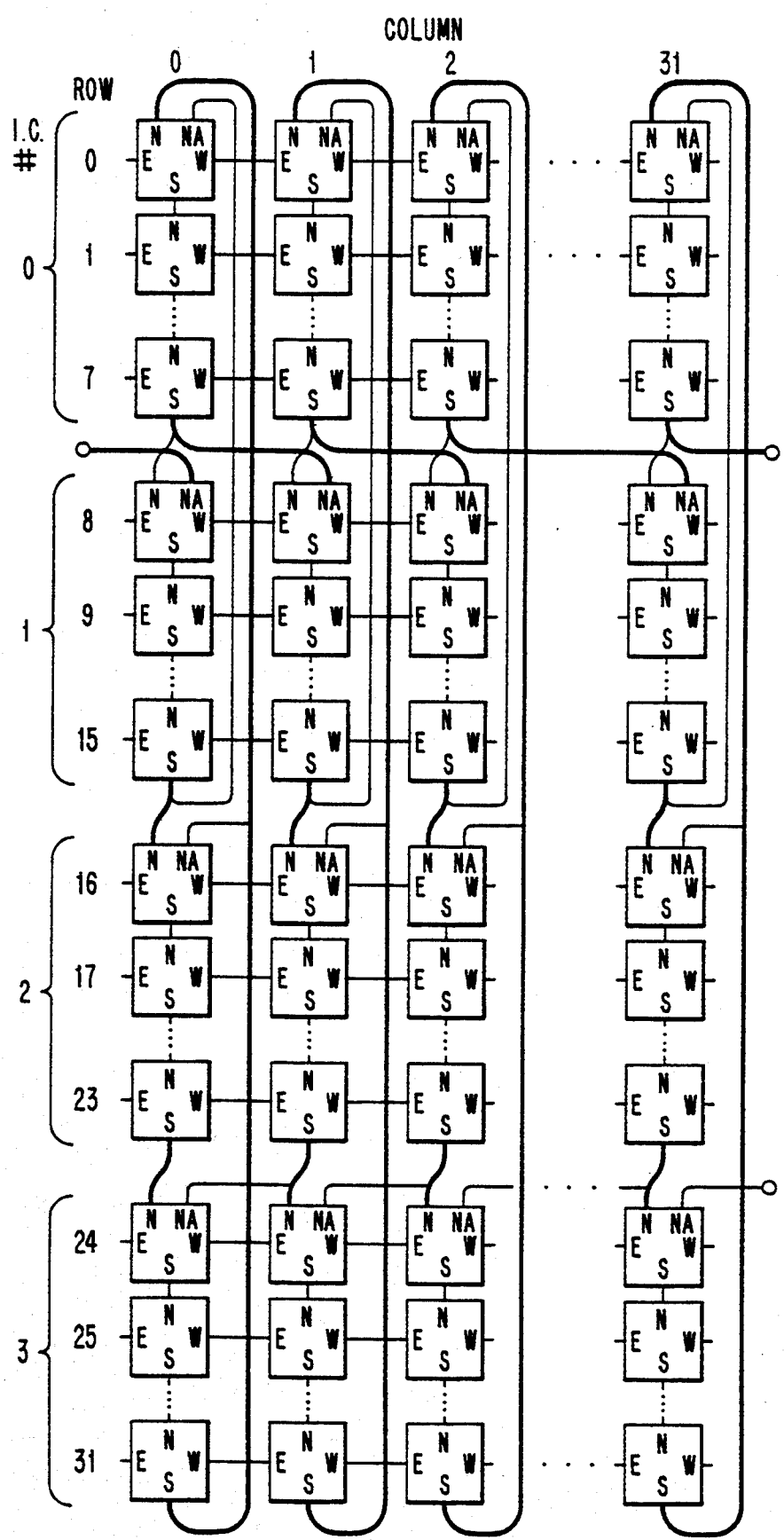

The other multiplexer network comprises bidirectional semiconductor switches or multiplexers $M_0''$ through $M_7''$ on the eight north edge cells. These allow selection of either a "normal" north data path (to data input/output unit 20) or an "alternate" north data path (to another cell on the same or a different chip). The array 10 is thus no longer limited to north, south, east, west connectivity. For example, consider a 32×32 array made up of 4×4 subarrays of 64 cells each, with the north edge cells of each subarray being provided with a switchable north alternate connection as shown in FIG. 3(a). Each subarray may, for example, be on a separate semiconductor chip. By appropriate interconnection of north and north alternate inputs, the array can be reconfigured as two 16×32 arrays (FIG. 3(b)) or as one 1024×1 array (FIG. 3(c)). Thus, the second multiplexer network has great utility in varying connection of multiple-chip arrays.

The north alternate connector may also be connected to a memory device to extend logically the memory capability of each cell and to allow data operands to be rolled in and rolled out as necessary. It also provides a port which can be connected to an I/O device or other processing cells in the array to allow for corner turn operations.

Figure 4A:
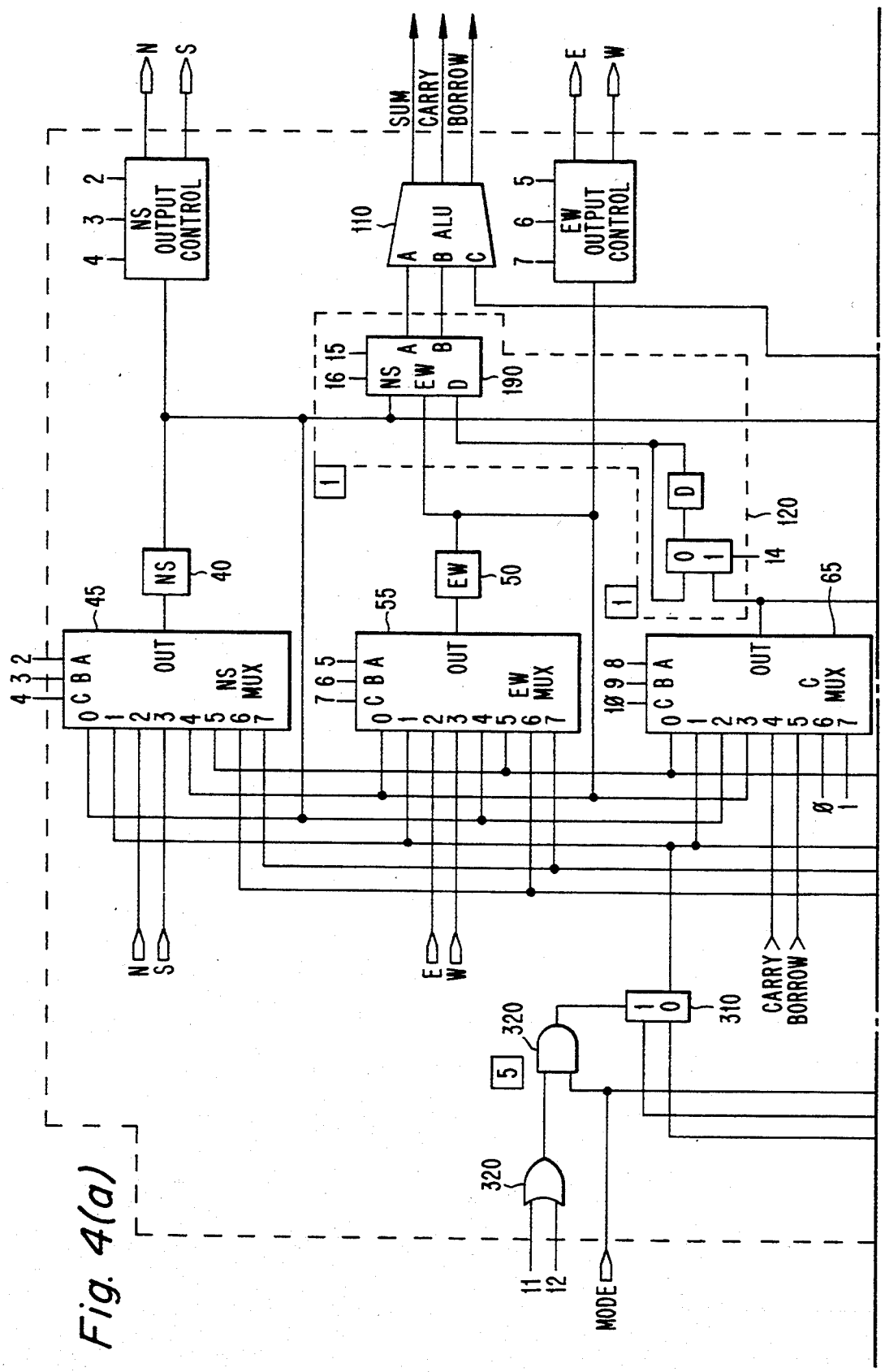
FIGS. 4(a) and 4(b) are a schematic diagram of a preferred embodiment of a cell according to the invention.
Figure 4B:
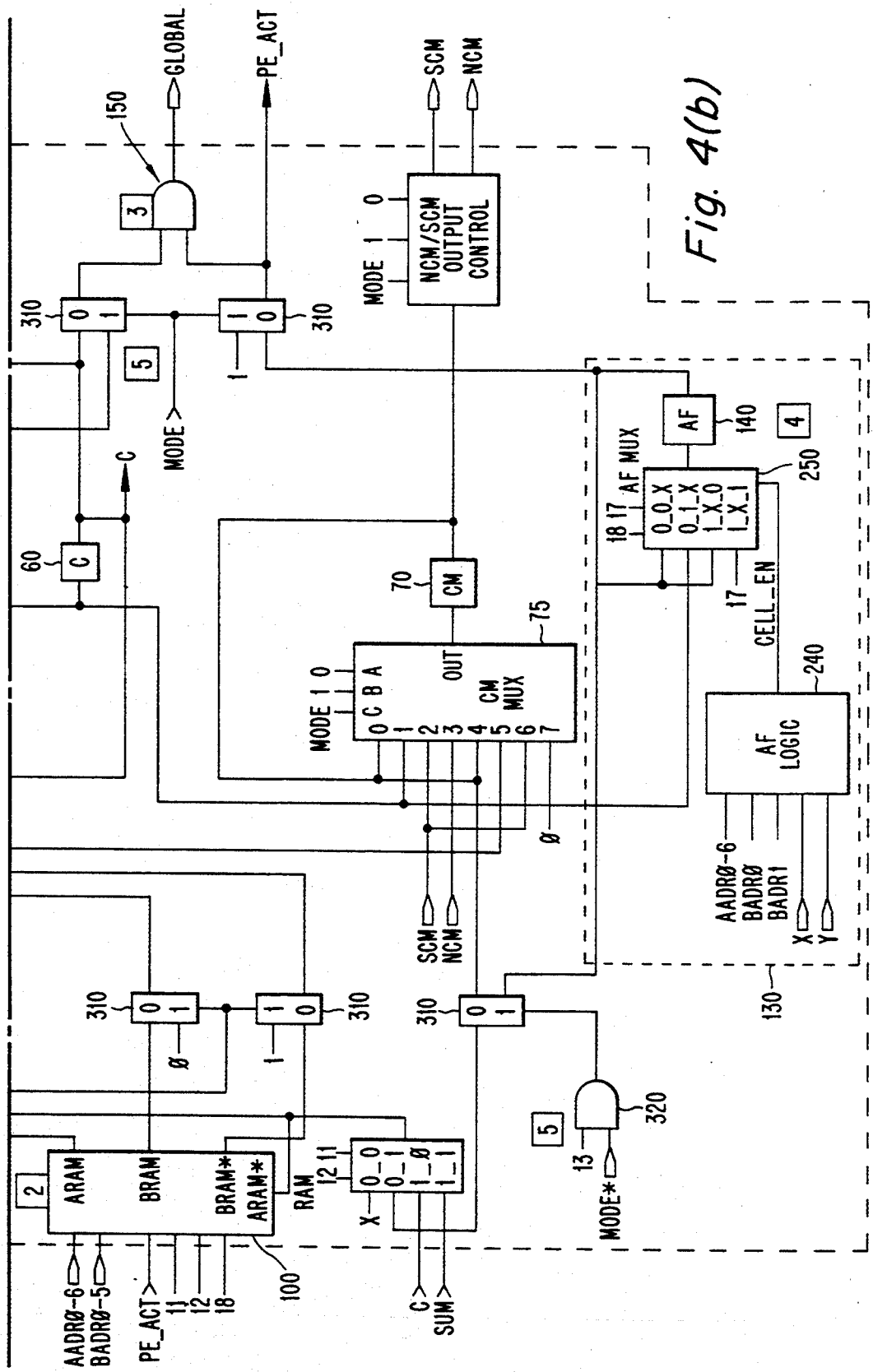

A preferred embodiment according to the present invention may also include one or more enhancements in the architecture of the individual cells. As can be seen in FIGS. 4(a) and 4(b) (henceforth referred to collectively as FIG. 4), the cell may include a group of registers, namely, a north-south (NS) register 40, an east-west (EW) register 50, a carry (C) register 60, and a communication (CM) register 70. It also includes a group of corresponding multiplexers, namely, an NS multiplexer 45, an EW multiplexer 55, a C multiplexer 65, and a CM multiplexer 75.

The registers are single bit and provide working storage and communications functions for the cell. The NS and CM registers are sources or destinations for data flowing north or south. Thus, the NS register 40 can communicate bidirectionally with the NS registers of its north and south neighboring cells. The CM register provides I/O communications to each cell bidirectionally along the north-south axis. The difference between these two is that operation of the CM register 70 does not influence operation of an arithmetic logic unit (ALU) 110 also incorporated into the cell. As a consequence, the CM register 70 can perform input/output functions without interfering with the ALU 110 which allows I/O to occur without interfering with normal processing. The EW registers 50 are the sources and destinations of data flowing east or west. Each multiplexer controls data flow from various sources to its respective register under control signals originating from a master controller such as controller 30 of FIG. 1.

The cell may incorporate various additional elements, which will be described below in detail. These include a memory 100, which, as will be described below, is segmented to provide flexibility in data storage and retrieval. It also includes a conditional logic unit (CLU) 120 which, as will be developed below, simplifies and accelerates data processing according to certain algorithms. The cell may also incorporate AF logic circuitry 130, which includes a single-bit register AF register 140. This circuitry defines two states, activated and deactivated. Also included is Global OR (GLOR) circuitry 150, which is used in forming a signal which is a logical "or" of all active cells in the array. The signal is the product of "anding" the output of the C register 60 with that of the AF register 140.

The various functions of these circuits will now be described in greater detail.

Arithmetic functions within the cell are performed by the ALU 110 which operates on data presented to it under the control of the master controller 30. The inputs to the ALU 110 are the C register 60 and the outputs from a conditional logic circuit 120 described below, which obtains its data from the NS register 40 and the EW register 50. The ALU 110 may send its output to any of these registers or to the memory 100. Specifically, when the ALU 110 is a single bit full adder/subtractor, the SUM output can be written to a memory 100 and the CARRY and BORROW outputs can be used as inputs to the C register 60. Multi-bit operations such as addition are carried out by adding the operands on a bit-by-bit basis, while propagating the resultant carry into the next higher-order addition.

All multi-bit operands must be stored in the memory 100. Thus, performance of almost all operations is highly dependent on the capabilities of memory 100. For example, in an architecture where the memory has only a single port, and so can perform only a single read or write per clock cycle, an n-bit operation would require 2n cycles for reading two operands, n cycles for writing each partial sum, and one cycle for writing the final carry value, for a total of $3n+1$ clock cycles. Thus, a memory which permits only a single read or a single write per cycle is a bottleneck for computationally intensive algorithms.

Figure 5:
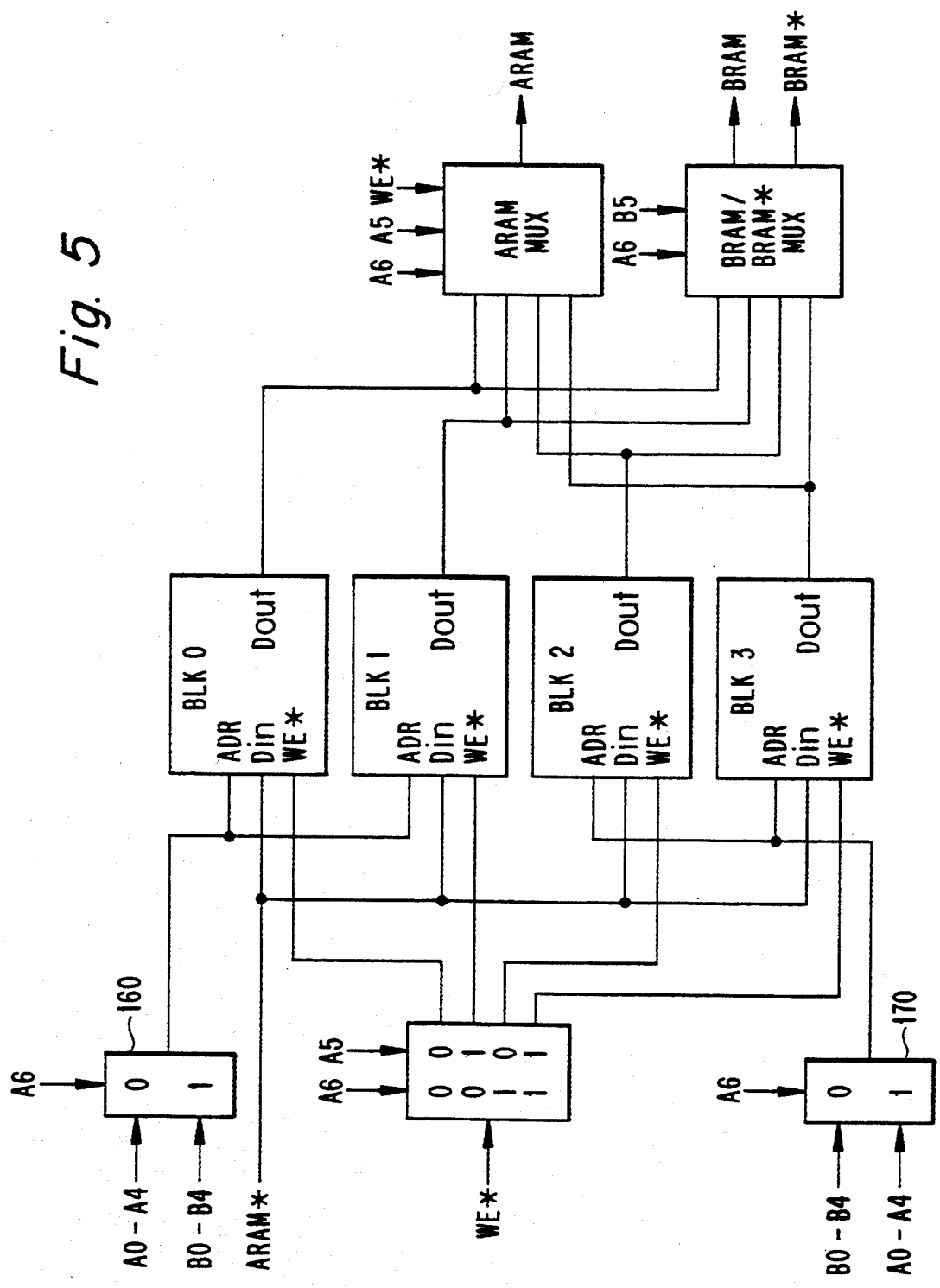
FIG. 5 is a schematic diagram of a preferred embodiment of a segmented memory according to the invention.

Due to the great dependence of cell efficiency on the memory 100, it is preferred in the present invention to use a segmented RAM as the memory 100. "Segmented" herein refers to a virtual or logical division of the RAM into at least semi-independently operable blocks. In a preferred implementation shown in FIG. 5, the memory 100 is 128 bits divided into four contiguous blocks BLK0 through BLK3, of 32 bits each. Each block is preferably a separate, single-ported memory, that can perform either a single read, or a single write, in one clock cycle. It will be appreciated in the embodiment described, however, that there can be no more than one write to the entire RAM per clock cycle. It will also be appreciated that each block may be a multi-ported memory, if such would provide advantages for a given application. Servicing the blocks BLK0 through BLK3 are three read ports, ARAM, BRAM, and BRAM*, and one write port ARAM*. Two address busses service these ports. The first, AADR or A0 through A6, sources the address for operations on the ARAM and ARAM* ports. The second, BADR or B0–B5, sources the address for operations on the BRAM and BRAM* ports. Memory address decode logic circuits 160 and 170 use selected address bits, for example, the upper address bits, to select which port is to be connected to which block. The decode logic is provided to ensure that only one port is allocated to each block for a given address on the busses. The signal WE* is an internally generated write enable signal.

The provision of 2 address busses, 3 read ports, and 1 write port creates a pseudo multi-port capability. Addressing options allow for either 1, 2, or 3 reads per clock cycle. The inclusion of simultaneous read/write capability means that n-bit operations such as addition can now be performed in $n+2$ clock signals, instead of $3n+1$. This is a net improvement of 2.5 to 1 in the case of an 8-bit add.

The memory 100 may be loaded from the C register 60, the CM register 70, an AF register 140, or the SUM output of the ALU 110. The outputs of memory 100 may be loaded into the NS register 40, EW register 50, C register 60, CM register 70, a D register 190, or the AF register 140.

Figure 6:
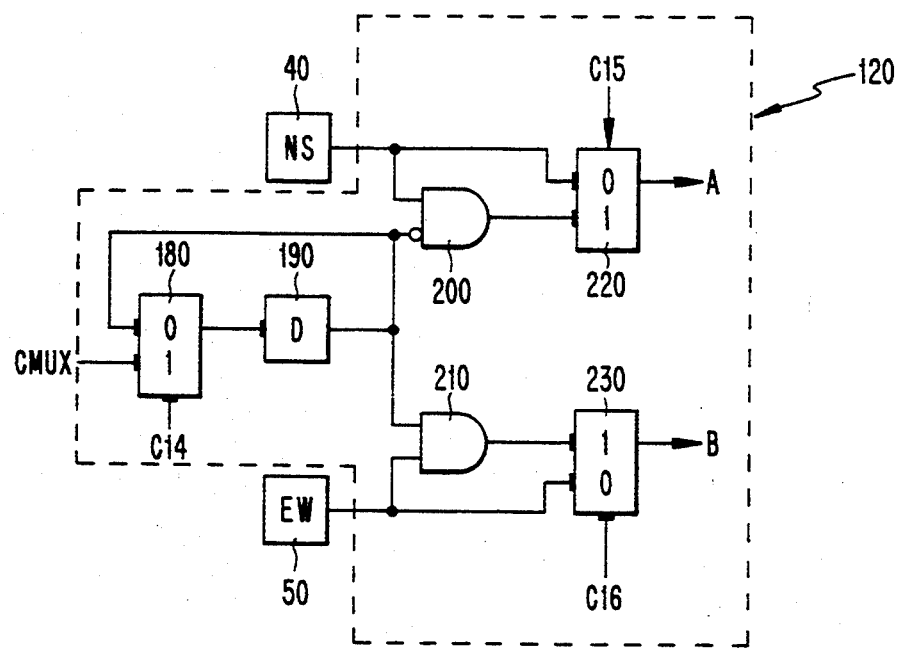
FIG. 6 is a schematic diagram of a preferred embodiment of a conditional logic unit according to the invention.

The cell is also naturally very dependent on the capabilities of ALU 110. To enhance the capabilities of this element, it is preferred to include in the cell a conditional logic unit (CLU) 120, as shown in FIG. 6. The CLU 120 includes an input multiplexer 180 with inputs connected to the output of C multiplexer 65 and to the output of a D register 190. The input multiplexer 180 is controlled by an appropriate control signal. Its output is connected to the input of the D register 190. The output of the D register 190 is also connected to a first logic gate 200 and a second logic gate 210. In the embodiment of FIG. 6, these are AND gates. One input of the first logic gate 200 is connected to the NS register 40; the other input is connected to the D register 190 and, in the embodiment of FIG. 6, is an inverting input. One input of the second logic 210 is also connected to the input of D register 190. The other input is connected to the EW register 50.

The CLU 120 also includes a first output multiplexer 220 and a second output multiplexer 230. The inputs for the first multiplexer 220 are the outputs of the NS register 40 and the first logic gate 200. The inputs for second output multiplexer 230 are the outputs of the EW register 50 and the second logic gate 210.

The CLU 120 allows both conditional arithmetic operation and conditional selection operation on the operands of the NS register 40 and the EW register 50 based on the contents of the D register 190. This leads to great simplification of operations such as multiplication. For example, without conditional logic, the algorithm for multiplication of two multi-bit numbers involved a reiterative process of "anding" the first bit of the multiplier with the multiplicand to form a first partial sum, and then "anding" the second bit of the multiplier with the multiplicand and adding the result to the first partial sum to form a second partial sum, continuing for each successive bit until the product is formed.

The following example is indicative, with the usual right justification on bit placement:

```
        101     (Multiplicand)
        011     (Multiplier)
     000101     (1st Partial Sum)
   +    101
     001111     (2nd Partial Sum)
   +    000
     001111     (Product)
```

The CLU 120 eliminates the requirement for "anding" by providing a conditional summation capability. This allows the partial sum to be conditionally added to the multiplicand based on the present multiplier-bit value. If the multiplier bit is 0, then the next partial sum is the present partial sum since 0*x=0. If the multiplier bit is 1, the next partial sum is the sum of the present sum and the multiplicand. Right justification in bit placement is accomplished by incrementing the starting address of the partial sum operand by one after each iteration.

In the context of the device shown in FIG. 6, multiplication would be carried out by loading a zero into the NS register 40, the multiplicand into the EW register 60, and the least significant multiplier bit into the D register 190. The CLU 120 then selects the multiplicand if the contents of the D register 190 is "1". The partial sum is then loaded into the NS register 40, the multiplicand into the EW register 60, and the next significant multiplier bit into the D register 190. The multiplicand is added to the partial sum if the contents of the D register 190 is "1". The process is repeated as necessary to derive the final product.

The cell also preferably includes "Activity Flag" (AF) logic or circuitry 130. This circuitry is used to place the cell in one of two states—activated or deactivated. An activated cell participates in algorithm execution. A deactivated cell does not. The state is determined by the contents of the AF register 140. For example, a set register may indicate activated cell, so that a reset register would then indicate a deactivated cell.

The contents of the AF register 140 may be generated either internally, for example, through the C multiplexer 65 as shown, as a result of internal algorithm execution. This would provide an indication of status of internal algorithm execution. Alternatively, however, the contents of the AF register 140 may originate externally and be directed to the cell as a result of decoding by an AF logic unit 240. The AF logic unit may decode an address appearing, for example, on address bus AADR as shown. This permits a row, column, or individual cell to be uniquely selected. The AF logic unit 240 may also be responsive to two select lines X and Y. These lines are used in a multi-chip array to select a particular chip, row of chips, or column of chips.

The AF logic unit 240 generates a value (cell enable) applied to an AF multiplexer 250 to in turn determine the value of the AF register 140 if that value is to be determined externally.

As an example of how such a system would work in practice, consider the system of FIG. 4 where the AF logic unit 240 is responsive to the AADR address bus, to control signals on two lines of the BADR address bus, and to control signals designated C17 and C18. The signals on the AADR address bus select the row, column, or individual cell. The X and Y select lines select chips in a multi-chip array. The control signals BADR1, BADR0, C17, and C18 can then be used to select whether the value of the AF register 140 at the address indicated is internally derived, whether the cell (or the row or column containing it) should be externally activated or deactivated. When a cell is active, its "Global" output contributes to the overall GLOR output signal and writes to the cell's memory 100 are enabled. A deactivated cell's "Global" output cannot contribute to the overall GLOR output signal and writes to the cell's memory 100 are inhibited.

The AF circuitry 130 address decoding logic thus provides a means to obtain information concerning algorithm execution by a cell through use of the GLOR output signal. For example, if an array sum as previously described were being carried out, the final sum could be obtained through the GLOR output if all other cells except that at the southeastern corner were inactive.

As another example of the usefulness of the GLOR output in combination with the AF logic circuitry 130, consider the performance of a content addressable memory function. After all cells concurrently search, the combination of GLOR with the AF logic circuitry could be used to determine not only whether any cell uncovered a match, but also the location of the cell.

Figure 7:
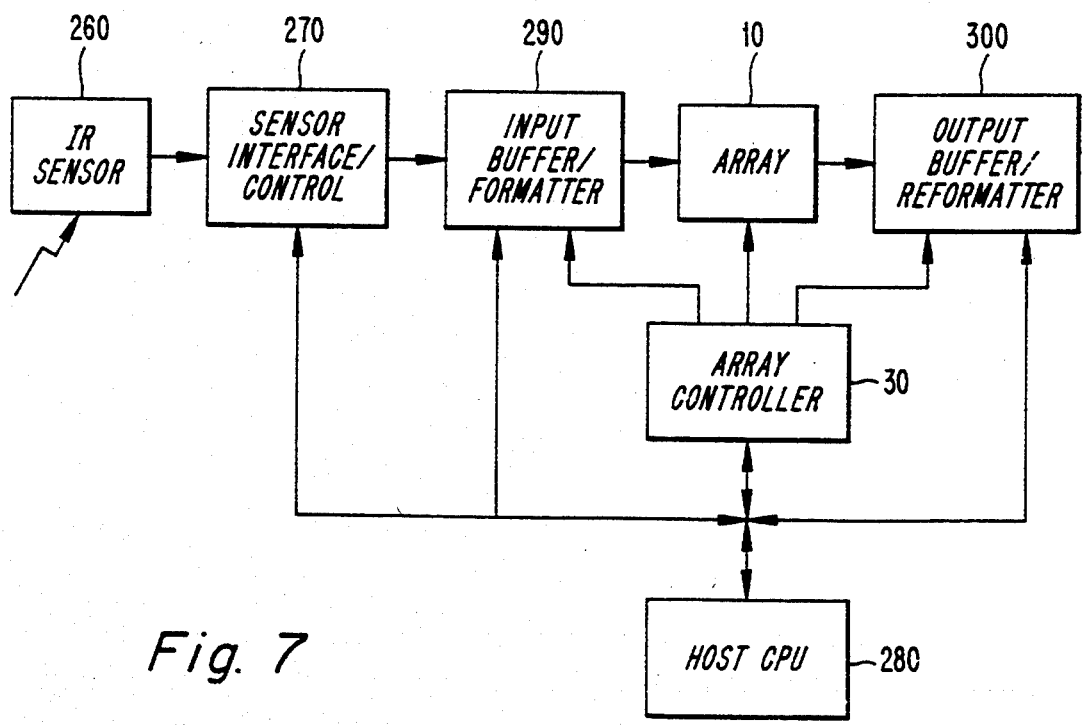
FIG. 7 is a block diagram of a typical application for a processor array according to the present invention.

FIG. 7 depicts schematically a concrete application for a parallel data processor according to the present invention, as a component of a infrared image processing system. Such a system typically requires a resolution of 512×512 pixels per frame, 8-bits per pixel, and a frame update rate of 30 Hz. With these characteristics, a real-time pixel processor must maintain an average throughput rate of 262,144 pixels every 33.33 ms. The parallel processor of the present invention is ideally suited to perform a two-dimensional data processing problem of this type. The theoretical ideal would be one processor per pixel, or, in other words, a 512×512 array of cells. At a clock rate of 20 MHz, this would permit execution of nearly 666,666 instructions every 33.33 ms. Usually, however, a smaller array is used, with the image being processed as a series of overlapping sub-images.

In addition to the array 10 and array controller 30, the system includes an IR sensor 260, a sensor interface/control 270, and a host CPU 280. A data input buffer/formatter 290 and a data output buffer/formatter 300 together perform the functions ascribed to data input/output circuit 20 of FIG. 1.

The IR sensor 260 and sensor interface 270 are front-end modules common to most applications of this type. The IR energy received by IR sensor 260 is converted to digital data by sensor interface 270. The digital data must then be transposed from a data word stream to a data bit plane format to enable transfer to the array 10 for processing. A bit plane is a two-dimensional plane (i.e., array or matrix) of data bits of common significance, of the same size as the array 10. This transposition, called pixel to plane conversion, is carried out by input buffer/formatter 290. The output buffer/formatter 300 performs the inverse operation, to make the output comprehensible to the host CPU 280. The array controller 30 coordinates program execution with the bit-plane I/O. It is similar in design to controllers found in most bit-slice systems.

Other system embellishments are possible. For example, logic can be incorporated to selectively enable, disable or modify functions to make the cells or array compatible with other parallel data processors. Such a scheme is implemented in the embodiment of FIG. 4 through the provision of a series of multiplexers 310 and gates 320 connected as shown to operate in response to, for example, a "mode" command, to disable the segmented RAM and AF logic enhancements, or at least to prevent those enhancements from interfering with cell operation.

The invention has been described above in terms of specific embodiments merely for the sake of elucidation. No statement above is intended to imply that the above embodiments are the only fashion in which the invention may be embodied or practiced, and no statement above should be so construed. To the contrary, it will be readily apparent to one of ordinary skill in the art that it is possible to conceive of many embodiments not described above which nevertheless embody the principles and teachings of the invention. The invention should therefore not be limited to what is described above, but instead should be regarded as being fully commensurate in scope with the following claims.

What is claimed is:

1. In a parallel data processor, an apparatus comprising:
   input means for receiving control signals; and
   a plurality of identical cells, each of said identical cells being connected to at least one neighboring cell and responsive to said control signals for processing data in accordance with said control signals, each of said identical cells including:
      cell logic means for performing logical operations; and
      a memory segmented into at least two blocks, said memory coupled to said cell logic means such that said cell logic means performs more than one read/write operation per clock cycle from/to said memory when directed to do so by said control signals.

2. The apparatus of claim 1, wherein said memory is a random access memory.

3. The apparatus of claim 2 wherein said random access memory is divided into four blocks and comprises at least two address busses, at least three read ports, and at least one write port.

4. The apparatus of claim 1, wherein the input means and the plurality of identical cells are fabricated as a very large scale integrated circuit chip.

5. The apparatus of claim 4, wherein said memory is a random access memory.

6. The apparatus of claim 5 wherein said random access memory is divided into four blocks and comprises at least two address busses, at least three read ports, and at least one write port.

7. The apparatus of claim 1, further comprising a controller, coupled to said input means, for generating said control signals.

8. The apparatus of claim 1, wherein the memory comprises:
   a first block of addressable storage cells for storing data associated with a low part of a memory address space, the first block being capable of alternatively performing either a read or a write operation in one clock cycle;
   a second block of addressable storage cells for storing data associated with a high part of the memory address space, the second block being capable of alternatively performing either a read or a write operation in one clock cycle;
   a data input port;
   a write enable input port for receiving a write enable signal;
   a first address input port;
   a second address input port;
   selective coupling means, responsive to a first received address supplied to the first address input port, for coupling the first address input port, the data input port, and the write enable input port to the first block and coupling the second address input port to the second block when the first received address designates a storage address corresponding to the low part of the memory unit address space, the selective coupling means further responsive to the first received address for coupling the first address input port, the data input port, and the write enable input port to the second block and coupling the second address input port to the first block when the first received address designates a storage address corresponding to the high part of the memory unit address space, whereby the first and second blocks are semi-independently operable.

9. The apparatus of claim 8, wherein the input means and the plurality of identical cells are fabricated as a very large scale integrated circuit chip.

10. In a parallel data processor, an apparatus comprising:

input means for receiving control signals; and a plurality of identical cells, each of said identical cells being connected to at least one neighboring cell and responsive to said control signals for processing data in accordance with said control signals, each of said cells including:

cell logic means for performing logical operations; and a memory having at least three ports, said memory coupled to said cell logic means so that said cell logic means performs more than one read/write operation per clock cycle from/to said memory when directed to do so by said control signals.

11. The apparatus of claim 10, wherein said memory is a random access memory.

12. The apparatus of claim 11 wherein said random access memory comprises at least three read ports and at least one write port.

13. The apparatus of claim 10, further comprising a controller, coupled to said input means, for generating said control signals.

14. In a parallel data processor, an apparatus comprising:

input means for receiving control signals; and a plurality of identical cells, each of said identical cells being connected to at least one neighboring cell and responsive to said control signals for processing data in accordance with said control signals, each of said identical cells including:

first means, including a full adder/subtractor, for performing logical and arithmetic operations, and a plurality of memory means, connected to said controller and said first means, for selectively retaining digital data, at least one of said memory means being segmented into at least two blocks, said at least one segmented memory means being coupled to said first means and to a remaining memory means from said plurality of memory means such that said first means and said remaining memory means perform more than one read/write operation per clock cycle from/to said at least one segmented memory means when directed to do so by the control signals.

15. The apparatus of claim 14, wherein the at least one segmented memory means comprises:

a first block of addressable storage cells for storing dam associated with a low part of a memory address space, the first block being capable of alternatively performing either a read or a write operation in one clock cycle;

a second block of addressable storage cells for storing data associated with a high part of the memory address space, the second block being capable of alternatively performing either a read or a write operation in one clock cycle;

a data input port;

a write enable input port for receiving a write enable signal;

a first address input port;

a second address input port;

selective coupling means, responsive to a first received address supplied to the first address input port, for coupling the first address input port, the data input port, and the write enable input port to the first block and coupling the second address input port to the second block when the first received address designates a storage address corresponding to the low part of the memory unit address space, the selective coupling means further responsive to the first received address for coupling the first address input port, the data input port, and the write enable input port to the second block and coupling the second address input port to the first block when the first received address designates a storage address corresponding to the high part of the memory unit address space, whereby the first and second blocks are semi-independently operable.

16. The apparatus of claim 15, wherein the input means and the plurality of identical cells are fabricated as a very large scale integrated circuit chip.

17. The apparatus of claim 14, further comprising a controller, coupled to said input means, for generating said control signals.

18. The apparatus of claim 14, wherein said segmented memory means comprises a random access memory.

19. The apparatus of claim 18, wherein said random access memory is divided into four blocks and comprises at least two address busses, at least three read ports, and at least one write port.

20. The apparatus of claim 14, wherein the input means and the plurality of identical cells are fabricated as a very large scale integrated circuit chip.

21. The apparatus of claim 20, wherein said segmented memory means comprises a random access memory.

22. The apparatus of claim 21, wherein said random access memory is divided into four blocks and comprises at least two address busses, at least three read ports, and at least one write port.

23. In a parallel data processor, an apparatus comprising:

input means for receiving control signals; and a plurality of identical cells, each of said identical cells being connected to at least one neighboring cell and responsive to said control signals for processing data in accordance with said control signals, each of said identical cells including:

first means, including a full adder/subtractor, for performing logical and arithmetic operations, and a plurality of memory means, connected to said input means and said first means, for selectively retaining digital data, at least one of said memory means having at least three ports, said at least one memory means being coupled to said first means and to a remaining memory means from said plurality of memory means such that said first means and said remaining memory means perform more than one read/write operation per clock cycle from/to said at least one memory means when directed to do so by the control signals.

24. The apparatus of claim 23, wherein said at least one memory means comprises a random access memory.

25. The apparatus of claim 24, wherein said random access memory has at least three read ports and at least one write port.

26. The apparatus of claim 23, further comprising a controller, coupled to said input means, for generating said control signals.

27. In a parallel data processor, an apparatus comprising:
  input means for receiving control signals; and
  a plurality of identical cells, each of said identical cells being connected to at least one neighboring cell and responsive to said control signals for processing data in accordance with said control signals, each of said identical cells including:
    first means, including a full adder/subtractor, for carrying out logical algorithms;
    a register for receiving and storing data from said at least one neighboring cell; and
    second means, responsive to said control signals, for selectively generating an indication of whether the said first means is currently engaged in carrying out said algorithms,
    wherein when said first means is not currently engaged in carrying out said algorithms, said register receives and stores data from said at least one neighboring cell when directed to do so by said control signals.

28. The apparatus of claim 27, further comprising a controller, coupled to said input means, for generating said control signals.

29. The apparatus of claim 27, wherein each cell includes memory means for selectively retaining and retrieving digital data, and wherein said second means selectively inhibits storage in said memory means.

30. The apparatus of claim 27, wherein said second means is individually addressable by said control signals.

31. In a parallel data processor, an apparatus comprising:
  input means for receiving control signals; and
  a plurality of identical cells, each of said identical cells being connected to at least one neighboring cell and responsive to said control signals for processing data in accordance with said control signals, each of said identical cells including:
    first means, including a full adder/subtractor, for carrying out logical algorithms; and
    second means, responsive to said control signals, for selectively generating an indication of whether the said first means is currently engaged in carrying out said algorithms; and
    third means for generating a signal to be logically combined with similar signals from other cells to generate a global signal, and wherein said second means selectively disables said third means so that said cell does not contribute to said global signal.

32. In a parallel data processor, an apparatus comprising:
  input means for receiving control signals; and
  a plurality of identical cells, each of said identical cells being connected to at least one neighboring cell and responsive to said control signals for processing data in accordance with said control signals, each of said identical cells including:
    first means, including a full adder/subtractor, for carrying out logical algorithms; and
    second means, responsive to said control signals, for selectively generating an indication of whether the said first means is currently engaged in carrying out said algorithms,
    wherein said second means is also responsive to said first means, and generates said indication in response to either said control signals, or a signal generated by said first means.

33. In a parallel data processor, an apparatus comprising:
  input means for receiving control signals; and
  a plurality of identical cells, each of said identical cells being connected to at least one neighboring cell and responsive to said control signals for processing data in accordance with said control signals, each of said identical cells including:
    at least two data registers for storing digital data;
    means for storing a control value;
    first means, connected to said data registers and to said control value means, for conditionally carrying out preliminary operations on digital data from said data registers in response to an output from said control value storing means; and
    second means, responsive to said first means and including a full adder/subtractor, for carrying out arithmetic and logical functions on digital data from said first means.

34. The apparatus of claim 33, further comprising a controller, coupled to said input means, for generating said control signals.

35. A parallel data processor comprising:
  a controller for generating control signals; and
  a plurality of identical cells, each of said cells being connected to at least one neighboring cell and responsive to said controller for processing data in accordance with said control signals, and including;
    at least two data registers for storing digital data, and
    first means, connected to said data registers, for conditionally carrying out preliminary operations on digital data from said data registers, and
    second means, responsive to said first means and including a full adder/subtractor, for carrying out arithmetic and logical functions on digital data from said first means,
    wherein said at least two data registers comprise a first data register and a second data register, and wherein said first means includes:
    a first logic gate having a first input terminal connected to said first data register;
    a second logic gate having a first terminal connected to said second data register;
    first selecting means, responsive to said controller, and connected to an output terminal of said first data register and said first logic gate, for selecting one of the output the first data register and the output of the first logic gate;
    second selecting means, responsive to said controller, and connected to said second data register and to an output terminal of said second logic gate, for selecting one of the output of the second data register and the output of said second logic gate; and
    means, connected to a second input terminal of said first logic gate and to a second input terminal of said second logic gate, for generating a control value.

36. A parallel data processor as claimed in claim 35, wherein said control value generating means comprises:
  a third data register connected to said second input terminal of said first logic gate and said second input terminal of said second logic gate; and
  third selecting means, responsive to said controller for selecting as an output to said third data register an externally-applied signal or the contents of said third data register.

37. A parallel data processor as claimed in claim 36, wherein said second means comprises a full adder having first and second data input terminals, and wherein an output of said first selecting means is connected to said first data input terminal, and an output of said second selecting means is connected to said second data input terminal.

38. In a parallel data processor, an apparatus comprising:
   input means for receiving control signals;
   an n×m array of identical processing cells, n and m being positive integers, each of said identical processing cells being connected to at least one neighboring cell and responsive to said control signals for processing data in accordance with control signals; and
   n selecting means, respectively connected and responsive to n edge cells of said n×m array, for selectively connecting an associated one of said edge cells to one of at least two external I/O devices in response to said control signals.

39. The apparatus of claim 38, further comprising a controller, coupled to said input means, for generating said control signals.

40. In a parallel data processor, an apparatus comprising:
   input means for receiving control signals;
   a plurality of identical cells each responsive to said control signals for processing data in accordance with said control signals and selectively interconnected to other cells of said plurality to form a cell array; and
   means for enhancing computational ability of said apparatus, including bypass means interconnected between predetermined cells of said array and responsive to said control signals for selectively establishing data paths bypassing portions of said array.

41. The apparatus of claim 40, wherein said bypass means comprises a plurality of multiplexer/demultiplexers respectively connected between said portions of said array.

42. The apparatus of claim 40, wherein said array is arranged in rows and columns, and wherein said bypass means is arranged for selectively bypassing selected rows and columns.

43. The apparatus of claim 40, further comprising a controller, coupled to said input means, for generating said control signals.

* * * * *

UNITED STATES PATENT AND TRADEMARK OFFICE
CERTIFICATE OF CORRECTION

PATENT NO.   : 5,421,019
DATED        : May 30, 1995
INVENTOR(S)  : Holsztynski et al.

It is certified that error appears in the above-indentified patent and that said Letters Patent is hereby corrected as shown below:

At column 3, line 4, change "art" to --an--;
Col. 11, In Claim 15, at line 4, change "dam" to --data--;
Col. 14, In Claim 35, at line 7, change "ing;" to --ing:--.

Signed and Sealed this

Thirteenth Day of February, 1996

Attest:

BRUCE LEHMAN

Attesting Officer          Commissioner of Patents and Trademarks